United States Patent
Holl

(10) Patent No.: US 6,647,865 B2
(45) Date of Patent: Nov. 18, 2003

(54) HOT-AIR LID

(76) Inventor: Josef Holl, Feldstrasse 8, Seewalchen A 4863 (AT)

(*) Notice: Subject to any disclaimer, the term of this patent is extended or adjusted under 35 U.S.C. 154(b) by 0 days.

(21) Appl. No.: 10/343,342

(22) PCT Filed: Aug. 8, 2001

(86) PCT No.: PCT/AT01/00263
§ 371 (c)(1),
(2), (4) Date: Jan. 29, 2003

(87) PCT Pub. No.: WO02/11591
PCT Pub. Date: Feb. 14, 2002

(65) Prior Publication Data
US 2003/0145741 A1 Aug. 7, 2003

(30) Foreign Application Priority Data
Aug. 9, 2000 (AT) .......................................... 1374/2000

(51) Int. Cl.⁷ .......................... A47J 37/06; A47J 37/10; A47J 27/00; A47J 27/04; A47J 36/38
(52) U.S. Cl. ............................ 99/339; 99/448; 99/450; 220/573.1; 220/912
(58) Field of Search ................... 99/339, 340, 352–355, 99/403, 413, 426, 415, 423–425, 444–450; 126/369, 20, 373.1; 220/573.1, 573.5, 573.4, 573.3, 573.2, 912, 4.01

(56) References Cited

U.S. PATENT DOCUMENTS

| | | | | | |
|---|---|---|---|---|---|
| 1,752,584 A | * | 4/1930 | Biette | ...................... | 220/573.1 |
| 1,877,009 A | * | 9/1932 | Mills | ........................ | 99/448 X |
| 2,023,571 A | * | 12/1935 | Blitz | ........................ | 99/403 X |
| 2,223,432 A | * | 12/1940 | Smith | ........................ | 99/448 X |
| 2,573,719 A | | 11/1951 | Lebherz | | |
| 2,742,850 A | | 4/1956 | La Fond | | |
| 4,574,776 A | * | 3/1986 | Hidle | .......................... | 126/369 |
| 5,235,904 A | * | 8/1993 | Ludena | ........................ | 99/413 |
| 5,511,466 A | * | 4/1996 | Dzibinski | .................... | 99/339 |
| 5,584,235 A | | 12/1996 | DuBois et al. | | |
| 5,595,108 A | * | 1/1997 | Sheu | ........................ | 99/413 X |
| 5,996,574 A | * | 12/1999 | Loyd et al. | ............. | 220/912 X |
| 6,000,319 A | * | 12/1999 | Treiber | ..................... | 99/450 X |
| 6,293,271 B1 | * | 9/2001 | Barbour | ................... | 126/369 X |
| 6,360,654 B1 | * | 3/2002 | Cornfield | ..................... | 99/339 |
| 6,526,875 B1 | * | 3/2003 | Dzbinski | ..................... | 99/339 |

FOREIGN PATENT DOCUMENTS

| | | |
|---|---|---|
| DE | 94 18 325.2 | 3/1995 |
| DE | 44 12 843 | 10/1995 |
| DE | 196 04 598 | 8/1997 |
| EP | 0 712 596 | 5/1996 |
| EP | 0 780 078 | 6/1997 |
| EP | 0 788 754 | 8/1997 |

* cited by examiner

Primary Examiner—Timothy F. Simone
(74) Attorney, Agent, or Firm—Collard & Roe, P.C.

(57) ABSTRACT

A hot-air lid (1) for containers (2) used for cooking and frying is proposed. In order to provide advantageous construction conditions it is proposed that it consists of an upper part (3) and a lower part (4) which can be fixed in said upper part and which together with the upper part (3) forms a cooking chamber (5), with the lower part (4) having an upwardly oriented curved part (6) with steam outlet openings (7) and with a reflector (8) being provided around said curved part (6) in which further through openings (9) are located.

9 Claims, 2 Drawing Sheets

HOT-AIR LID

CROSS REFERENCE TO RELATED APPLICATIONS

Applicant claims priority under 35 U.S.C. §119 of Austrian Application No. A 1374/2000 filed Aug. 9, 2000. Applicant also claims priority under 35 U.S.C. §365 of PCT/AT01/00263 filed Aug. 8, 2001. The international application under PCT article 21(2) was not published in English.

1. Field of the Invention

The invention relates to a hot-air lid for containers used for cooking and frying.

2. Description of the Prior Art

Known hot-air frying pan lids use filters for the absorption of smells for example (DE 44 12 843) and should ensure an especially efficient frying or cooking of the items to be fried or cooked (EP 0 712 596 A). It is further known (EP 0 788 754 A1, EP 0 780 078 A1 and U.S. Pat. No. 5,584,235 A) to steam an item to be cooked in a cooking device which is charged with steam. Especially careful cooking of an item to be cooked is not possible with the aforementioned apparatuses because they do not produce any hot air stream that flows about the item to be cooked.

SUMMARY OF THE INVENTION

On the basis of this, it is the object of the present invention to avoid the aforementioned disadvantages and to provide a hot-air lid of the kind mentioned above in such a way that the same allows a particularly careful cooking of an item to be cooked in a hot-air stream.

The invention achieves this object in such a way that the hot-air lid consists of an upper part and a lower part which can be fixed in said upper part and which together with the upper part forms a cooking chamber, with the lower part having an upwardly oriented curved part with steam outlet openings and with a reflector being provided around said curved part in which further openings are located.

By heating a pan, the air enclosed in the pan is heated and enters the cooking chamber through the steam outlet openings in the curved part and then flows around the item to be cooked resting on the reflector during the return flow from the cooking chamber into the pan and cooks said item in a particularly careful fashion. The guidance and effect of the flow is supported in a particularly efficient manner by the subsequent chimney effect arising from the upwardly oriented curved part. In order to prevent that water condensing on the upper part of the lid reaches the lower region of the pan or in order to keep the condensation water from reaching the item to be cooked, the reflector is provided with a bead or groove enclosing the region of the through openings, which bead or groove prevents the return flow of formed condensation water into the pan. When the circumferential bead, which extends at a radial distance form the outer edge of the lower part, projects upwardly then this leads in a simple fashion to a sufficiently larger receiving area between the bead and edge of the lower part for the obtained condensation water and a higher stability and thus an increased torsional stability of the lower part. Instead of the upwardly projecting circumferential bead, it is also possible to provide a downwardly projecting circumferential groove or bead. In this case either the bead or the groove will receive the condensation water.

The flow effect of the hot air about the item to be cooked is improved to a substantial extent when the lower part comprises an upwardly bent edge with through openings, through which the hot air flow can reach the lower region of the pan again where the air or steam is heated again and is supplied to the cooking chamber.

Especially simple constructional conditions are obtained when the lower part comprises at least two downwardly projecting holding brackets which are swivelably held in the edge zone and engage in an undercut of the edge of the upper part. As a result, the lower part for cooking merely needs to be inserted into the upper part together with the item to be cooked for cooking purposes and then to be fixed in the same, whereupon the hot-air frying pan lid in accordance with the invention is placed on a pan for example and said pan is heated by means of a conventional stove. After the cooking process the holding brackets are released, whereupon the lower part plus the cooked item can be removed from the upper part. Moreover, the above measures ensure that the lower part sits close to the upper part in a sealed fashion.

If the upper part is provided with a through opening which can be released in an optional manner with the help of a handle element which is held in a rotationally adjustable fashion on the upper part, with the rotational adjustment being limited by a stop, the steam pressure in the cooking or frying container can be regulated in a particularly simple manner and a lift-off of the hot-air lid from the pan for example can be prevented securely. It is thus ensured that the hot-air lid will always rest securely on the cooking or frying container.

When the handle element holds a thermometer for displaying the temperature in the cooking chamber, the temperature in the cooking chamber can be checked in a particularly advantageous manner. The regulation of the cooking chamber temperature occurs by an adjustment of the energy supply, i.e. for example by adjusting the heating level of a heating plate.

Particularly simple conditions are obtained from a constructional viewpoint when the handle element comprises a through opening for a latching set-off of the thermometer which can be inserted in a receiving recess of the handle element, with said latching set-off latching into a latching receiver of the upper part in the manner of a snap. As a result of this measure the handle element is clamped in a simple manner between the upper part and the thermometer on the one hand and can be removed at any time from the upper part on the other hand because the thermometer is detachably connected with the upper part via the latching set-off. It has proved to be advantageous when the latching set-off is arranged as a temperature sensor for the thermometer because in this case it is no longer necessary to provide any further transmission members between the thermometer and the latching set-off or the upper part.

BRIEF DESCRIPTION OF THE DRAWINGS

The invention is now explained in closer detail by reference to the subject matter of the invention shown schematically in the drawings, wherein.

DESCRIPTION OF THE PREFERRED EMBODIMENTS

Figure 1:
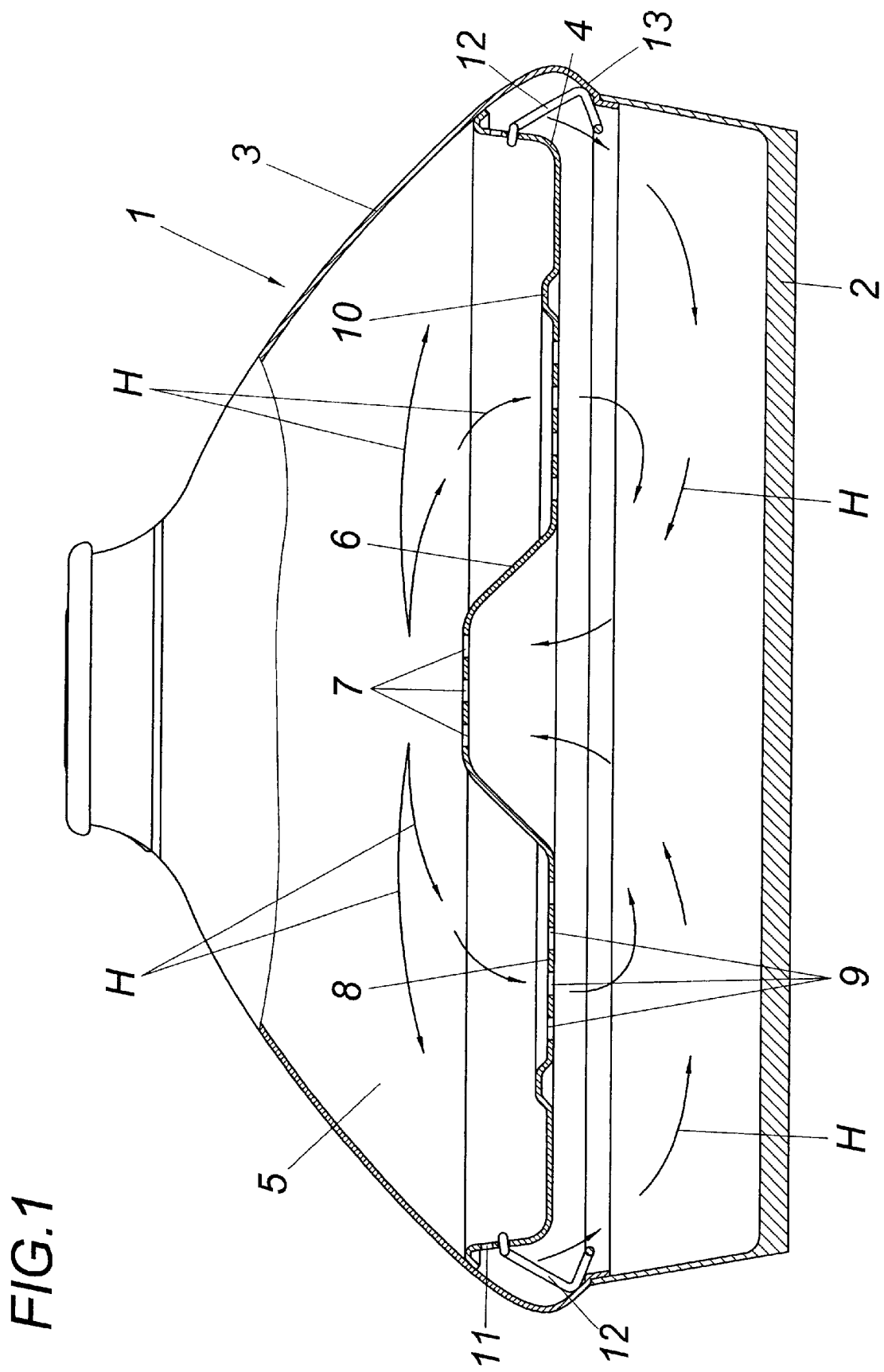
FIG. 1 shows a hot-air lid in accordance with the invention as placed on a container for frying in a partial sectional side view.

A hot-air lid 1 for a pan 2 consists of an upper part 3 and a lower part 4 which can be fastened in said upper part 3.

Upper part 3 and lower part 4 jointly enclose a cooking chamber 5, with the lower part 4 comprising an upwardly facing elevated part 6 with steam outlet openings 7. The elevated part 6 is enclosed by a reflector 8 in which further through openings 9 are located. An upwardly projecting bead 10 is incorporated in the lower part 4, which bead is situated at a radial distance from the outer edge and prevents the return flow of condensation water in pan 2 which forms on the upper part 3. At the upwardly bent edge of the lower part 4 there are also through openings 11, through which the hot air flow H can reach from the cooking chamber 5 to the cooking or frying container 2. For the purpose of fastening the lower part 4 in the upper part 3, two holding brackets 12 are provided on the lower part 4, which brackets are held in the edge region, project downwardly and engage in an undercut 13 of the edge of the upper part 3.

Items to be cooked, such as vegetables, meat and the like, are merely placed on the lower part 4 or the reflector 8, the lower part is placed in the upper part 3 and fastened with the holding brackets 12 on the upper part 3. Then the hot-air lid 1 is placed on the pan 2 and the pan 2 is supplied with heat by means of a conventional stove. The heating of the pan 2 leads to a heating of the air in the same. The heated air rises as a result of the chimney effect through the steam outlet openings 7 of the upwardly facing elevated part 6 into the cooking chamber 5, flows around the items to be cooked and flows thereafter through the through openings 11 and the reflector 8 back to the cooking and frying container 2, whereupon the air is heated again and the circulation closes. Water vapor condensing on the upper part 3 is collected between the edge zone of the lower part 4 and the bead 10 and prevented from flowing back into the cooking and frying container 2.

Figure 2:
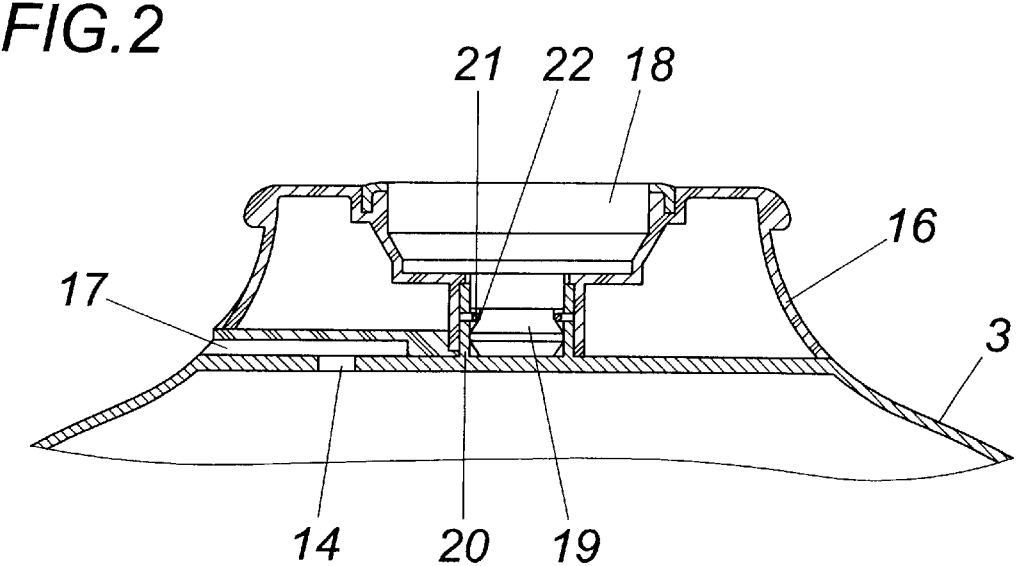
FIG. 2 shows a handle element of a hot-air lid in accordance with the invention in a partial sectional side view and on an enlarged scale.
Figure 3:
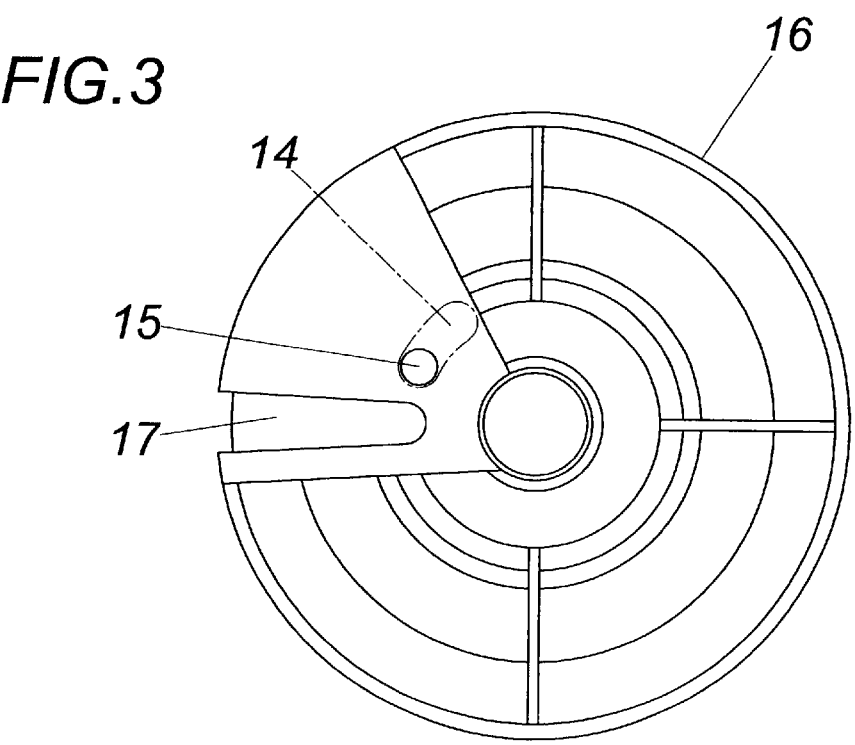
FIG. 3 shows a bottom view of the handle element of FIG. 2.

Moreover, the upper part 3 comprises a through opening 14 (which is only indicated in FIG. 3) which can be released in an optional fashion with the help of a handle element 16 which is rotationally adjustable on the upper part 3 and is limited in its adjustment by means of a pin 15. In order to enable the optional removal of steam from the cooking chamber 5 through said through opening 14 and from the hot-air lid 1, a channel 17 for discharging the steam and hot air is shaped into the handle element 16. In FIG. 2 the through opening 14 is released and steam or hot air can be discharged from the interior of the container via the channel 17. FIG. 3 shows the handle element 16 swiveled to a position in which the through opening 14 is closed off by the handle element 16. The handle element 16 comprises on its upper side a recess for receiving a thermometer 18 for displaying the cooking chamber temperature and further comprises a through opening for a latching set-off 19 which is shaped on the thermometer 18, which latching set-off can be latched in the manner of a snap closure in a latching receiver 20 which is shaped on the upper part 3. In order to ensure a secure hold of the thermometer 18 on the upper part 3, a spring 21 is arranged in the latching receiver 20 which engages in an undercut 22 of the latching set-off 19. The handle element 16 is clamped between the upper part 3 and the thermometer 18. For the purpose of cleaning the hot-air lid 1, the thermometer 18, including the handle element 16, can be removed simply from the upper part 3 after overcoming the spring force. The latching set-off 19 is simultaneously arranged as a temperature sensor for the thermometer 18.

I claim:

1. A hot-air lid (1) for a container (2) used for frying and cooking, characterized in that it consists of an upper part (3) and a lower part (4) which can be fixed in said upper part and which together with the upper part (3) forms a cooking chamber (5), with the lower part (4) having an upwardly oriented curved part (6) with steam outlet openings (7) and with a reflector (8) being provided around said curved part (6) in which further through openings (9) are located.

2. A hot-air lid (1) as claimed in claim 1, characterized in that the reflector (8) comprises a bead or groove (10) enclosing the region of the through openings (9).

3. A hot-air lid (1) as claimed in claim 2, characterized in that the circumferential bead which extends at a radial distance from the outer edge of the lower part (4) projects upwardly.

4. A hot air lid (1) as claimed in claim 1, characterized in that the lower part (4) comprises an upwardly bent edge with through openings (11).

5. A hot-air lid (1) as claimed in claim 1, characterized in that the lower part (4) comprises at least two downwardly projecting holding brackets (12) which are swivelably held in the edge zone and engage in an undercut (13) of the edge of the upper part (3).

6. A hot-air lid (1) as claimed in claim 1, characterized in that the upper part (3) comprises a through opening (14) which can be released in an optional fashion with the help of a handle element (16) which is held in a rotationally adjustable fashion on the upper part (3), with the rotational adjustment being limited by a stop.

7. A hot-air lid (1) as claimed in claim 6, characterized in that the handle element (16) receives a thermometer (18) for displaying the temperature in the cooking chamber.

8. A hot-air lid (1) as claimed in claim 7, characterized in that the handle element (16) comprises a through opening for a latching set-off (19) of the thermometer (18) which can be inserted in a receiving recess of the handle element (16), with said latching set-off latching into a latching receiver (20) of the upper part (3) in the manner of a snap closure.

9. A hot-air lid (1) as claimed in claim 8, characterized in that the latching set-off (19) is arranged as the temperature sensor for the thermometer (18).

* * * * *